United States Patent
Baba (10) Patent No.: US 9,575,176 B2
(45) Date of Patent: Feb. 21, 2017

(54) TARGET DETECTING DEVICE FOR AVOIDING COLLISION BETWEEN VEHICLE AND TARGET CAPTURED BY SENSOR MOUNTED TO THE VEHICLE

(71) Applicant: DENSO CORPORATION, Kariya, Aichi-Pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 421 days.

(21) Appl. No.: 14/093,968

(22) Filed: Dec. 2, 2013

(65) Prior Publication Data

US 2014/0152488 A1 Jun. 5, 2014

(30) Foreign Application Priority Data

Dec. 3, 2012 (JP) ................. 2012-264509
Dec. 3, 2012 (JP) ................. 2012-264510

(51) Int. Cl.
*G01S 13/93* (2006.01)
*G01S 13/86* (2006.01)

(52) U.S. Cl.
CPC .......... *G01S 13/931* (2013.01); *G01S 13/867* (2013.01)

(58) Field of Classification Search
CPC ................. G01S 17/936; G01S 13/931; G01S 2013/9385; G01S 13/867

(Continued)

(56) References Cited

U.S. PATENT DOCUMENTS

2004/0080449 A1* 4/2004 Horibe .................. G01S 7/4026 342/70
2006/0207818 A1* 9/2006 Fujioka ..................... B60T 7/22 180/167

(Continued)

FOREIGN PATENT DOCUMENTS

JP 2005-280538 10/2005
JP 2005280538 A * 10/2005

(Continued)

OTHER PUBLICATIONS

Office Action dated Oct. 28, 2014 in corresponding Japanese Application No. 2012-264509.

(Continued)

*Primary Examiner* — Marcus Windrich
(74) *Attorney, Agent, or Firm* — Harness, Dickey & Pierce, P.L.C.

(57) ABSTRACT

The target detecting device comprises a radar sensor, an imaging sensor, and an ECU. The target detected by the radar sensor is selected under certain conditions, for example, i) a reception intensity of the reflected radar waves is equal to or more than a predetermined value, or ii) the target is moving, to be outputted externally. When a stopped vehicle is detected on a road by the sensor, and a target, for example a pedestrian, present behind the stopped vehicle is detected from the image acquired by the imaging sensor by performing image recognition using predetermined patterns of a target, the ECU makes the selection condition less restrictive than the selection condition for targets other than the target present behind the stopped vehicle, or unconditionally selects the target present behind the stopped vehicle.

4 Claims, 7 Drawing Sheets (58) Field of Classification Search
USPC .......................................................... 342/70
See application file for complete search history.

(56) References Cited

U.S. PATENT DOCUMENTS

| | | | | |
|---|---|---|---|---|
| 2006/0244635 A1* | 11/2006 | Chavarria | .............. | G08G 1/162 340/944 |
| 2007/0222566 A1* | 9/2007 | Tsuji | .................. | G06K 9/00791 340/435 |
| 2010/0033364 A1* | 2/2010 | Kishida | ................. | G01S 13/345 342/70 |
| 2011/0260909 A1* | 10/2011 | Ogawa | .................. | G01S 7/4876 342/70 |
| 2013/0010112 A1* | 1/2013 | Goto | .................. | G06K 9/00805 348/148 |

FOREIGN PATENT DOCUMENTS

| | | |
|---|---|---|
| JP | 2006-284293 | 10/2006 |
| JP | 2008-242571 | 10/2008 |
| JP | 4313712 B2 | 8/2009 |
| JP | 2010-179701 | 8/2010 |
| JP | 2010-218246 | 9/2010 |

OTHER PUBLICATIONS

Office Action dated Oct. 28, 2014 in corresponding Japanese Application No. 2012-264510.
Office Action dated Oct. 31, 2014 in corresponding Korean Application No. 10-2013-0146022.

* cited by examiner

TARGET DETECTING DEVICE FOR AVOIDING COLLISION BETWEEN VEHICLE AND TARGET CAPTURED BY SENSOR MOUNTED TO THE VEHICLE

CROSS-REFERENCE TO RELATED APPLICATION

This application is based on and claims the benefit of priority from earlier Japanese Patent Applications No. 2012-264509 and No. 2012-264510 respectively filed Dec. 3, 2012, the descriptions of which are incorporated herein by reference.

BACKGROUND

Field of the Invention

The present invention relates to a target detecting device for avoiding a collision between a vehicle and a target, such as a pedestrian, captured by a sensor mounted to the vehicle.

Description of the Related Art

Conventionally, a technology is known in which targets, such as pedestrians and vehicles, present near a reference vehicle are detected using a millimeter-wave sensor. Among the detected targets, a target that satisfies a predetermined condition, such as the intensity of reflected waves from the target being a predetermined value or more, is selected. Information on the selected target is then outputted. The outputted target information is used in a process for avoiding collision between the target and the reference vehicle, such as applying a brake of the reference vehicle. (see Japanese registered patent JP-B-4313712).

In Japanese registered patent JP-B-4313712, another technology is disclosed that an image of the area surrounding the reference vehicle is captured using an image sensor. An image recognition process is then performed on the captured image using patterns of a predetermined target such as a pedestrian or a vehicle. A target is detected as a result. The result of the target detection is used in a process for avoiding collision between the target and the reference vehicle such as applying the brake of the reference vehicle.

In some instances, the reference vehicle meets a pedestrian who suddenly steps out from behind a stopped vehicle. To avoid collision with the pedestrian, the reference vehicle is required to detect the pedestrian while the pedestrian is still behind the stopped vehicle.

From the perspective of the reference vehicle, a portion (particularly the lower body) of the pedestrian positioned behind the stopped vehicle is hidden from view by the stopped vehicle. Therefore, the intensity of reflected waves from the pedestrian is weak. As a result, the pedestrian positioned behind the stopped vehicle is not selected as a target for which information to be outputted. In addition, the lower body of the pedestrian positioned behind the stopped vehicle is hidden by the stopped vehicle, only the upper body of the pedestrian appears in the image captured by the image sensor. In this instance, the pedestrian may not be detected even when the image recognition process is performed using patterns of the entire body of a pedestrian.

Hence a target detecting device is desired that can effectively detect a target including a pedestrian that is present behind a stopped vehicle.

SUMMARY

The target detecting device comprises a radar sensor, an imaging sensor, and an ECU. The target detected by the radar sensor is selected under certain conditions, for example, i) a reception intensity of the reflected radar waves is equal to or more than a predetermined value, or ii) the target is moving, to be outputted externally.

As a first aspect of the target detecting device of the present application, when a stopped vehicle is detected on a road by the sensor and a target, for example a pedestrian, present behind the stopped vehicle is detected from the image acquired by the imaging sensor by performing image recognition using predetermined patterns of a target, the ECU makes the selection condition less restrictive than the selection condition for targets other than the target present behind the stopped vehicle, or unconditionally selects the target present behind the stopped vehicle.

Therefore, for example, even in an instance in which reception intensity of the reflected waves from the target behind the stopped vehicle is weak because of the stopped vehicle, the target detecting device can select the target and output information externally on the selected target.

As a second aspect of the target detecting device of the present application, when the stopped vehicle is detected on a road by the sensor, the ECU more preferentially detect a pedestrian at least in an area of the image that overlaps the stopped vehicle from the perspective of the reference vehicle, compared to an instance in which a stopped vehicle is not detected.

Therefore, the target detecting device is highly likely to detect a pedestrian even when a stopped vehicle is present ahead the pedestrian.

As a third aspect of the target detecting device of the present application, when the stopped vehicle is detected on a road by the sensor, the ECU makes criteria for detecting a pedestrian, in at least an area of the image that overlaps the stopped vehicle from the perspective of the reference vehicle, less restrictive compared to an instance in which a stopped vehicle is not detected.

Therefore, the target detecting device is highly likely to detect a pedestrian even when a stopped vehicle is present ahead the pedestrian.

DESCRIPTION OF EMBODIMENTS

Embodiments of the present invention will hereinafter be described with reference to the drawings.

<First Embodiment>

1. Configuration of a Target Detecting Device

Figure 1:
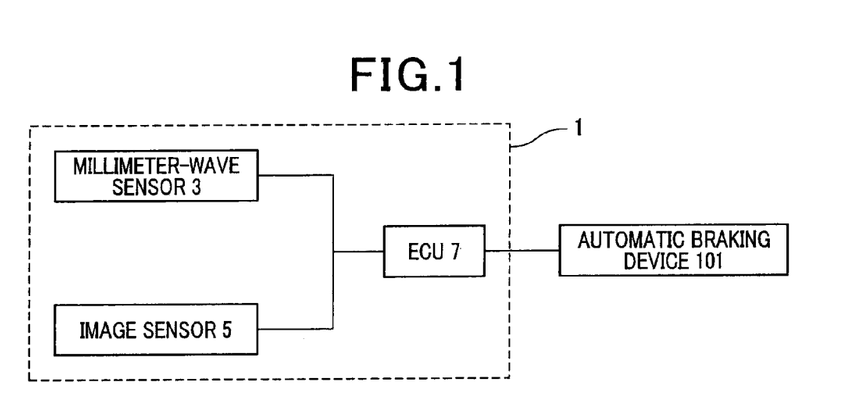
FIG. 1 shows a block diagram of a configuration of a target detecting device.

The first embodiment of the present invention will be described with reference to FIG. 1 to FIG. 4. In FIG. 1, the configuration of the target detecting device is shown. The target detecting device 1 is an on-board device that is mounted in a vehicle. The target detecting device 1 detects a target by performing a process described hereafter. The target detecting device 1 then outputs information on the target, such as the type of target, the orientation of the target relative to a reference vehicle, and the distance from the reference vehicle to the target. In the present application, the vehicle in which the target detecting device 1 is mounted is referred to as a "reference vehicle".

The target detecting device 1 includes a millimeter-wave sensor 3, an image sensor 5, and an electronic control unit (ECU) 7. The millimeter-wave sensor 3 is configured as a so-called "millimeter-wave radar" to which a frequency modulated continuous wave (FMCW) system is adopted. The millimeter-wave sensor 3 transmits and receives millimeter-wave band radar waves that have been frequency-modulated. The millimeter-wave sensor 3 detects the presence, orientation, and distance of a target that has reflected the millimeter waves. The range over which the millimeter-wave sensor 3 transmits the millimeter waves is a range that can include a target, such as another vehicle (including a stopped vehicle) or a pedestrian, present ahead of or to the side of the road on which the reference vehicle is traveling.

The image sensor 5 is a camera having a known configuration. The image sensor 5 captures the scene surrounding the reference vehicle (ahead of and to the side of the reference vehicle). As a result, the captured image (referred to, hereinafter, as simply an image) can be acquired. The ECU 7 has a known configuration including a central processing unit (CPU), a read-only memory (ROM), a random access memory (RAM), and the like. The ECU 7 performs processing operations described hereafter. The ROM stores therein programs used to perform the processing operations, described hereafter.

The ECU 7 can detect a target from the image acquired by the image sensor 5. The ECU 7 performs image recognition using patterns of a predetermined target to detect the target. In other words, the ECU 7 holds, in advance, patterns for image recognition. The patterns correspond with numerous types of targets, such as vehicles, the entire body of a pedestrian, and the upper body of a pedestrian. The ECU 7 selects 100 patterns from the patterns that are being held. The ECU 7 then performs image recognition by comparing each of the 100 patterns with the image acquired by the image sensor 5. Patterns of the upper body of a pedestrian are included in the 100 patterns.

As a result of image recognition, if there is a section of an image which has a high degree of coincidence with a predetermined pattern of the target, the ECU 7 recognizes the corresponding target in this, section. For each pattern, the ECU 7 performs the image recognition process a plurality of times. During the plurality of image recognition processes, if the same target is recognized N times or more, the ECU 7 determines that the target is detected.

The reference vehicle includes an automatic braking device 101. The automatic braking device 101 applies the brake of the reference vehicle depending on information outputted by the target detecting device 1. The automatic braking device 101 performs a process to avoid collision with a target based on the distance between the target detected by the target detecting device 1 and the reference vehicle.

In other words, when the distance to the detected target is long, the automatic braking device 101 issues a warning by sound or image to the driver of the reference vehicle. When the distance to the detected target becomes an intermediate distance, the automatic braking device 101 performs a process to apply the brake of the reference vehicle (the brake can be released by driver operation). When the distance to the detected target becomes close, the automatic braking device 101 performs a process to forcibly apply the brake of the reference vehicle (the brake cannot be released by the driver).

2. Process Performed by the Target Detecting Device 1

Figure 2:
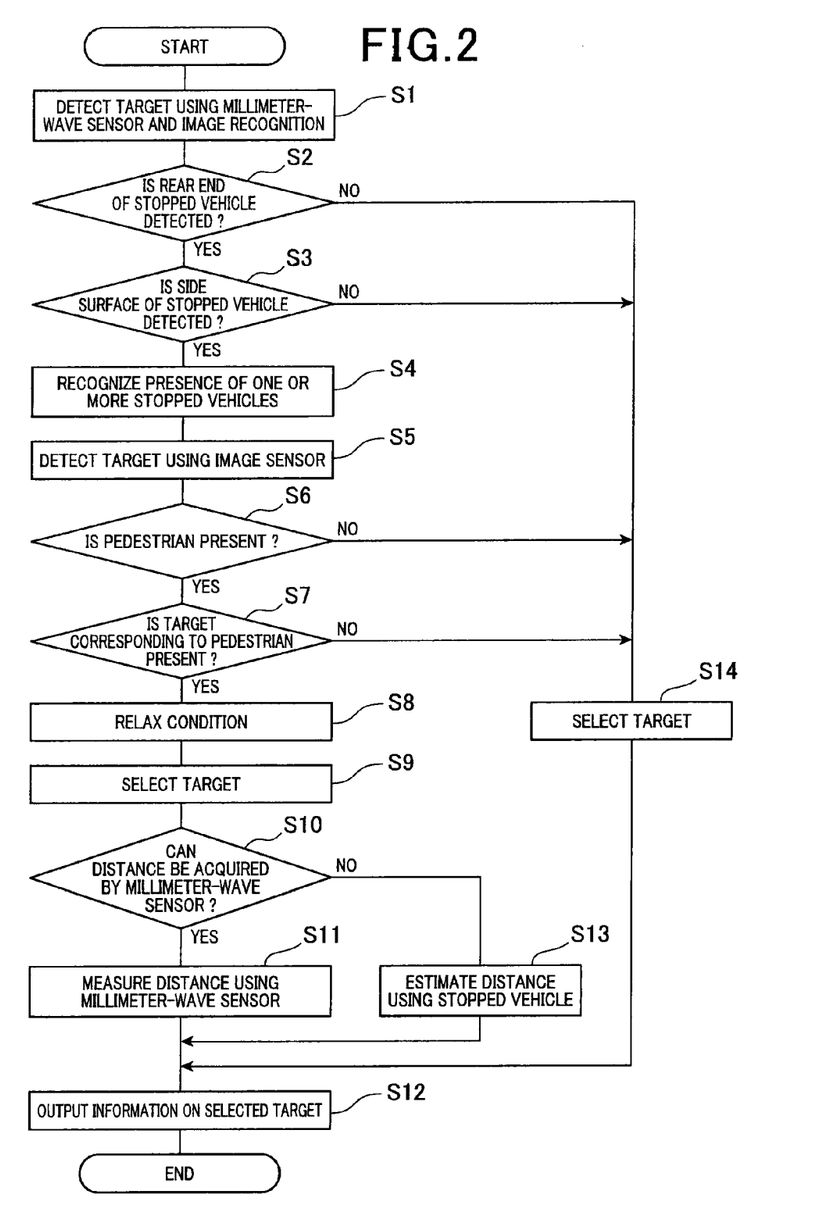
FIG. 2 shows a flowchart of a process performed by the target detecting device (first embodiment)

A process repeatedly performed by the target detecting device 1 at a predetermined interval will be described with reference to FIG. 2 to FIG. 4. At Step 1 in FIG. 2, the target detecting device 1 detects a target (such as another vehicle or a pedestrian) present near the reference vehicle using the millimeter-wave sensor 3. When a plurality of targets are present, the target detecting device 1 detects each target. In addition, at Step 1, the target detecting device 1 also detects the target by performing the above-described image recognition process using the image sensor 5 and the ECU 7.

At Step 2, the target detecting device 1 judges whether or not a rear end of a stopped vehicle can be detected ahead of or to the side of the reference vehicle. The target detecting device 1 makes the judgment using the target detection results at Step 1. Specifically, as shown in FIG. 3, the target detecting device 1 judges that a rear end 105*a* of a stopped vehicle 105 can be detected in the following instance. In other words, the rear end 105*a* of the stopped vehicle 105 that is in a stopped state (continuously present in the same position) is detected by the image recognition process performed at Step 1. In addition, the millimeter-wave sensor 3 acquires reflected waves corresponding to the rear end 105*a* that is in a stopped state (continuously present in the same position) at Step 1. In other instances, the target detecting device 1 judges that the rear end 105*a* cannot be detected. When judged that the rear end 105*a* can be detected, the target detecting device 1 proceeds to Step 3. When judged that the rear end 105*a* cannot be detected, the target detecting device 1 proceeds to Step 14.

At Step 3, the target detecting device 1 judges whether or not a side surface of a stopped vehicle can be detected. The target detecting device 1 makes the judgment using the target detection results acquired at Step 1. Specifically, as shown in FIG. 3, the target detecting device 1 detects a surface to be a side surface 105*b* of the stopped vehicle 105 in a following instance. In other words, at Step 1, the millimeter-wave sensor 3 detects a surface of which distances $r_1, r_2, r_3, \ldots$ from a virtual straight line 104 to the surface are constant. The virtual straight line 104 passes through the center of the reference vehicle 103 and extends towards the traveling direction of the reference vehicle 103. In addition, the surface detected by the millimeter-wave sensor 3 has a fixed positional relationship (a positional relationship applicable to that between the rear end and the side surface of a vehicle) with the rear end 105*a* detected at Step 2. In this instance, the target detecting device 1 detects the surface that has been detected by the millimeter-wave sensor 3 to be the side surface 105*b*. When judged that the side surface 105*b* can be detected, the target detecting device 1 proceeds to Step 4. When judged that the side surface 105*b* cannot be detected, the target detecting device 1 proceeds to Step 14.

At Step 4, the target detecting device 1 recognizes the presence of one or more stopped vehicles 105 near the reference vehicle based on the detection results at Step 2 and Step 3. At Step 5, the target detecting device 1 performs the above-described image recognition process using the image sensor 5 and the ECU 7. The image recognition process is performed on the area near the stopped vehicle 105 of which the presence is recognized at Step 4. The target detecting device 1 thereby detects the target. In the image recognition process, the patterns of the upper body of a pedestrian are mainly used.

At Step 6, the target detecting device 1 judges whether or not a pedestrian (an aspect of a target S) present behind the stopped vehicle 105 from the perspective of the reference vehicle 103 has been detected at Step 5. Here, when a pedestrian is present behind the stopped vehicle 105, the lower body of the pedestrian is hidden by the stopped vehicle 105 and only the upper body appears in the image acquired by the image sensor 5. Therefore, in the image recognition process performed at Step 5, a target matching a pattern of the upper body of a pedestrian is detected.

Therefore, when judged that a target matching the pattern of the upper body of a pedestrian is present as a result of the image recognition process performed at Step 5, the target detecting device 1 judges that a pedestrian present behind the stopped vehicle 105 has been detected. When judged that the pedestrian present behind the stopped vehicle 105 has been detected at Step 5 (in other words, when a target matching the pattern of the upper body of a pedestrian is detected), the target detecting device 1 proceeds to Step 7. When judged that a pedestrian present behind the stopped vehicle 105 has not been detected, the target detecting device 1 proceeds to Step 14.

At Step 7, the target detecting device 1 judges whether or not a target corresponding to the pedestrian detected at Step 5 is present among the targets detected using the millimeter-wave sensor 3 at Step 1. Here, a corresponding target is a target that has the same orientation, with reference to the reference vehicle 103, as the pedestrian detected at Step 5. Alternatively, the target is that of which the difference in orientation between the target and the pedestrian detected at Step 5 is a predetermined value or less. The corresponding target is very likely to be the same target as the pedestrian detected at Step 5. Hereafter, the target corresponding to the pedestrian is referred to as a pedestrian-corresponding target. When judged that the pedestrian-corresponding target is present, the target detecting device 1 proceeds to Step 8. When judged that the pedestrian-corresponding target is not present, the target detecting device 1 proceeds to Step 14.

At Step 8, the target detecting device 1 relaxes the condition for selection related to the pedestrian-corresponding target to a condition that is less restrictive (a condition that facilitates selection) than the condition in a normal situation. The condition for selection will be described hereafter.

At Step 9, the target detecting device 1 selects a target that satisfies a predetermined condition among the targets detected using the millimeter-wave sensor 3 at Step 1. The condition is that reception intensity of the reflected waves from the target is a predetermined value or more.

More specifically, the condition in a normal situation is that "the reception intensity of the reflected waves is a threshold $T_1$ or more." This normal condition is applied to targets other than the pedestrian-corresponding target, among the targets detected using the millimeter-wave sensor 3 at Step 1. A target satisfying this normal condition is selected.

On the other hand, the condition that is less restrictive than the normal condition, which has been set at Step 8, is applied to the pedestrian-corresponding target, among the targets detected using the millimeter-wave sensor 3 at Step 1. In other words, a condition that "the reception intensity of the reflected waves is a threshold $T_2$ or more" ($T_1 > T_2$) is applied to the pedestrian-corresponding target. The pedestrian-corresponding target is selected if this less-restrictive condition is satisfied.

At Step 10, the target detecting device 1 judges whether or not the distance from the reference vehicle 103 to the pedestrian-corresponding target can be acquired by the millimeter-wave sensor 3 (in other words, whether or not the intensity of the reflected waves from the pedestrian-corresponding target is sufficiently strong). When judged that the distance to the pedestrian-corresponding target can be acquired by the millimeter-wave sensor 3, the target detecting device 1 proceeds to Step 11. When judged that the distance cannot be acquired, the target detecting device 1 proceeds to Step 13.

At Step 11, the target detecting device 1 measures the distance from the reference vehicle 103 to the pedestrian-corresponding target using the millimeter-wave sensor 3. In addition, the target detecting device 1 similarly measures the distance for other targets that have been detected using the millimeter-wave sensor 3 at Step 1.

On the other hand, when judged at Step 10 that the distance to the pedestrian-corresponding target cannot be acquired by the millimeter-wave sensor 3, the target detecting device 1 proceeds to Step 13. The target detecting device 1 estimates the distance to the pedestrian-corresponding target using the stopped vehicle.

Figure 3:
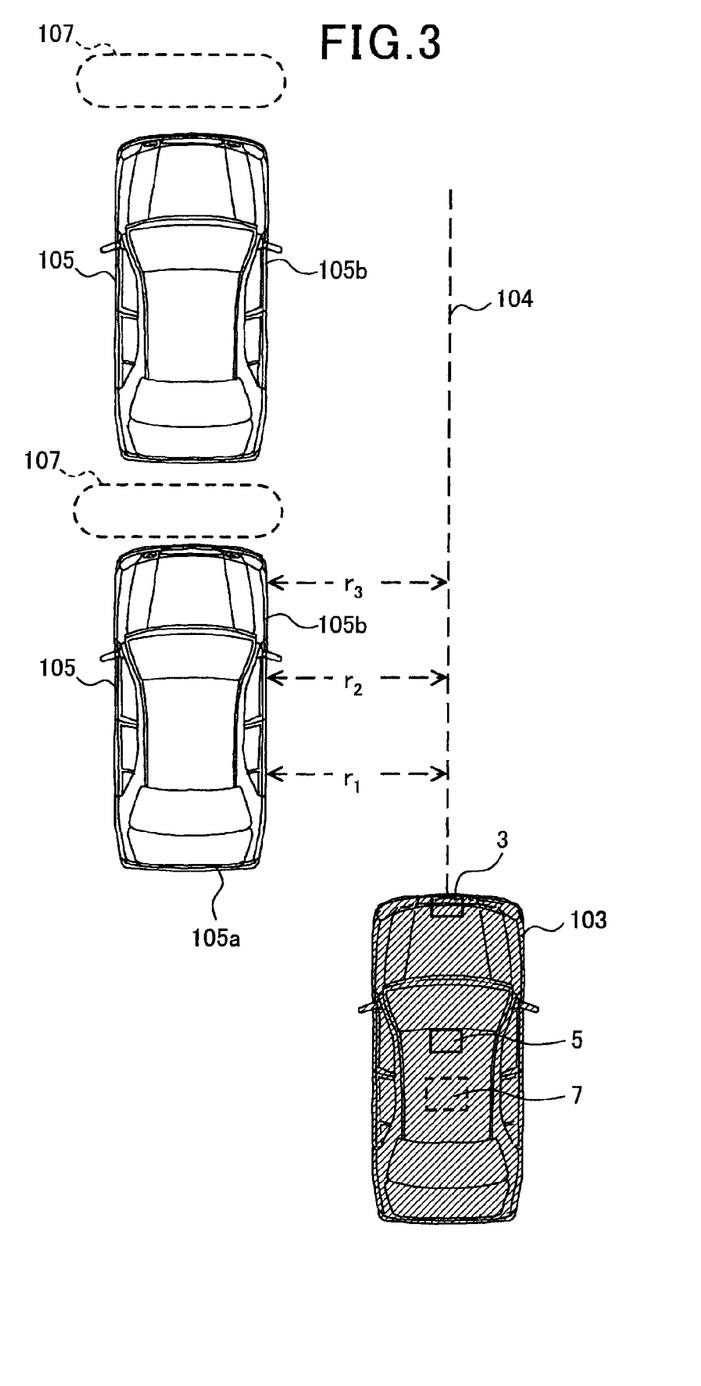
FIG. 3 shows a schematic diagram of the process performed by the target detecting device.

In other words, in FIG. 3, the pedestrian-corresponding target is estimated to be present in an area 107 behind the stopped vehicle 105 from the perspective of the reference vehicle 103. Therefore, the target detecting device 1 estimates the position of the area 107 (in other words, the position of the pedestrian-corresponding target) from the position of the stopped vehicle 105 and the length of the side surface 105b of the stopped vehicle 105. The target detecting device 1 acquires the distance from the reference vehicle 103 to the area 107 as the distance from the reference vehicle 103 to the pedestrian-corresponding target.

At Step 12, the target detecting device 1 outputs, to the automatic braking device 101, the information on the target (such as the type of target, the orientation of the target from the perspective of the reference vehicle 103, and the distance from the reference vehicle 103) selected at above-described Step 9 or Step 14, described hereafter.

On the other hand, when judged NO at any of above-described Step 2, Step 3, Step 6, and Step 7, the target detecting device 1 proceeds to Step 14. The target detecting device 1 selects a target satisfying a predetermined condition among the targets detected using the millimeter-wave sensor 3 at Step 1. The predetermined condition is the normal condition ("the reception intensity of the reflected waves is a threshold $T_1$ or more") and is applied to all targets.

3. Effects Achieved by the Target Detecting Device 1

(1) The target detecting device 1 relaxes the selection criteria for a pedestrian-corresponding target 109, among the targets detected using the millimeter-wave sensor 3. As shown in FIG. 4, the pedestrian-corresponding target 109 is positioned behind the stopped vehicle 105 from the perspective of the reference vehicle 103. As a result, the pedestrian-corresponding target 109 is more easily selected. Therefore, even in instances in which the reception intensity of reflected waves from the pedestrian-corresponding target is weak because of the stopped vehicle 105, the target detecting device 1 can select the pedestrian-corresponding target 109. The target detecting device 1 can then output information on the pedestrian-corresponding target 109.

(2) The pedestrian-corresponding target 109 may be present behind the stopped vehicle 105, from the perspective of the reference vehicle 103. The millimeter-wave sensor 3 may have difficulty measuring the distance to the pedestrian-corresponding target 109. However, even in such instances, the target detecting device 1 can estimate the position of the pedestrian-corresponding target 109 based on the position and length of the stopped vehicle 105.

4. Variation Examples of the First Embodiment (1) The condition for selecting the target at Step 9 and Step 14 may be that "the target is a moving object." In this instance, the process performed at Step 8 becomes such that the pedestrian-corresponding target is selected (unconditionally selected) at Step 9 even when the pedestrian-corresponding target is not moving.

The condition for selecting the target at Step 9 and Step 14 may be that a condition that "the reception intensity of the reflected waves is a threshold or more" and a condition that "the target is a moving object" are both satisfied. In this instance, the process at Step 8 becomes such that the condition for selecting the target at Step 9 is changed to require only the condition that "the reception intensity of the reflected waves is a threshold $T_2$ or more" to be satisfied.

(2) At Step 2, the condition for judging that the rear end 105a can be detected may be either of "the rear end 105a of the stopped vehicle 105 is detected by image recognition performed using the image sensor 5 and the ECU 7" and "the millimeter-wave sensor 3 acquires reflected waves corresponding with the rear end of the stopped vehicle 105a."

Next, a second embodiment of the present invention will be described with reference to the drawings.

<Second Embodiment>

1. Configuration of a Target Detecting Device

The configuration (hardware) of a target detecting device according to the second embodiment is basically the same as that of the target detecting device 1 according to the first embodiment. Differences will be described hereafter.

The target detecting device 1 according to the second embodiment includes the ECU 7. In a manner similar to that according to the first embodiment, the ECU 7 holds, in advance, patterns for image recognition. The patterns correspond with numerous types of targets, such as vehicles, the entire body of a pedestrian, and the upper body of a pedestrian. The ECU 7 selects 100 patterns from the patterns that are being held. The ECU 7 then performs image recognition by comparing each of the 100 patterns with the image acquired by the image sensor 5. Among the 100 patterns, the number P of patterns of the upper body of a pedestrian is normally 10. However, as described hereafter, the number P of patterns of the upper body of a pedestrian becomes 30 under a predetermined condition, such as a stopped vehicle being detected.

When a section of the image has a high degree of coincidence with a pattern of a predetermined target as a result of image recognition, the ECU 7 recognizes the target corresponding with this section. The ECU 7 performs the image recognition process a plurality of times for each pattern. When the same target is recognized N times or more during the plurality of image recognition processes that are performed, the ECU 7 judges that the target is detected. Here, the value of N is normally 3. However, as described hereafter, the value of N becomes 1 under a predetermined condition, such as a stopped vehicle being detected.

2. Process Performed by the Target Detecting Device 1

Next, a process repeatedly performed by the target detecting device 1 according to the second embodiment at a predetermined interval will be described with reference to FIG. 5, as well as above-described FIG. 3 and FIG. 4. FIG. 5 is a flowchart of the process performed by the target detecting device 1 according to the second embodiment. At Step 51 in FIG. 5, the target detecting device 1 performs target detection using the millimeter-wave sensor 3. The target detecting device 1 also performs the above-described image recognition process using the image sensor 5 and the ECU 7. The target detecting device 1 then judges whether or not the rear end of a stopped vehicle can be detected ahead of or to the side of the reference vehicle based on the acquired results.

Specifically, as shown in above-described FIG. 3, the target detecting device 1 judges that the rear end 105a of the stopped vehicle 105 can be detected in the following instance. In other words, the rear end 105a of the stopped vehicle 105 that is in a stopped state (continuously present in the same position) is detected by image recognition. In addition, the millimeter-wave sensor 3 acquires reflected waves corresponding to the rear end 105a that is in a stopped state (continuously present in the same position). In other instances, the target detecting device 1 judges that the rear end 105a cannot be detected. When judged that the rear end 105a can be detected, the target detecting device 1 proceeds to Step 52. When judged that the rear end 105a cannot be detected, the target detecting device 1 proceeds to Step 62.

At Step 52, the target detecting device 1 performs target detection using the millimeter sensor 3. The target detecting device 1 then judges whether or not a side surface of a stopped vehicle can be detected from the detection result. Specifically, as shown in FIG. 3, the target detecting device 1 detects a surface to be the side surface 105b of the stopped vehicle 105 in a following instance. In other words, the millimeter-wave sensor 3 detects a surface of which distances $r_1, r_2, r_3, \ldots$ from the virtual straight line 104 to the surface are constant. The virtual straight line 104 passes through the center of the reference vehicle 103 and extends towards the traveling direction of the reference vehicle 103. In addition, the surface detected by the millimeter-wave sensor 3 has a fixed positional relationship (a positional relationship applicable to that between the rear end and the side surface of a vehicle) with the rear end 105a detected at Step 1. In this instance, the target detecting device 1 detects the surface that has been detected by the millimeter-wave sensor 3 to be the side surface 105b. When judged that the side surface 105b can be detected, the target detecting device 1 proceeds to Step 53. When judged that the side surface 105b cannot be detected, the target detecting device 1 proceeds to Step 62.

At Step 53, the target detecting device 1 recognizes the presence of one or more stopped vehicles 105 near the reference vehicle based on the detection results at Step 51 and Step 52. At Step 54, the target detecting device 1 changes the patterns used for image recognition by the image sensor 5 and the ECU 7, described above, to the patterns used under the condition that a stopped vehicle is present.

In other words, the target detecting device 1 divides the image acquired by the image sensor 5 into an area $A_1$ and remaining area $A_2$. The area $A_1$ overlaps with the vehicle 105, from the perspective of the reference vehicle 103. For the image recognition process performed on the area $A_1$, the number P of patterns of the upper body of a pedestrian included in the 100 patterns is 30 (such that the pedestrian can be preferentially detected). In addition, for the image recognition process performed on the area $A_2$, the number P of patterns of the upper body of a pedestrian included in the 100 patterns is the normal amount, 10.

At Step 55, the target detecting device 1 sets the above-described value of N of the image recognition processes performed using the image sensor 5 and the ECU 7 to the value used under the condition that a stopped vehicle is present. Specifically, for the image recognition processes performed on the area $A_1$ in the image acquired by the image sensor 5, the value of N when the pattern of the upper body of a pedestrian is used is 1 (the criteria for detecting a pedestrian is relaxed).

In other words, in the area $A_1$, a pedestrian is judged to be detected when the upper body of a pedestrian is recognized even once during the plurality image recognition processes performed using the patterns of the upper body of a pedestrian. On the other hand, for image recognition in the area $A_2$, the above-described value of N is the normal value, 3, for all patterns (including the patterns of the upper body of a pedestrian). In addition, when patterns other than the patterns of a pedestrian are used in area $A_1$, the value of N is the normal value, 3.

At Step 56, the target detecting device 1 performs target detection based on the above-described image recognition process performed using the image sensor 5 and the ECU 7. Here, the number P of patterns of the upper body of a pedestrian and the value of N that are used for image recognition in the area $A_1$ are those set at Step 54 and Step 55.

At Step 57, the target detecting device 1 judges whether or not a pedestrian has been detected in the area $A_1$ of the image at Step 56. When judged that a pedestrian has been detected in the area $A_1$ of the image, the target detecting device proceeds to Step 58. When judged that a pedestrian has not been detected, the target detecting device proceeds to Step 60.

At Step 58, the target detecting device 1 judges whether or not the distance from the reference vehicle 103 to the pedestrian in the area $A_1$ of the image can be acquired by the millimeter-wave sensor 3 (in other words, whether or not the intensity of the reflected waves from the pedestrian is sufficiently strong). When judged that the distance to the pedestrian can be acquired, the target detecting device 1 proceeds to Step 59. When judged that the distance cannot be acquired, the target detecting device 1 proceeds to Step 61.

At Step 59, the target detecting device 1 measures the distance from the reference vehicle 103 to the pedestrian in the area $A_1$ of the image using the millimeter-wave sensor 3. On the other hand, when judged that the distance to the pedestrian cannot be acquired by the millimeter-wave sensor 3 at Step 58, the target detecting device 1 proceeds to Step 61. The target detecting device 1 estimates the distance to the pedestrian using the stopped vehicle.

In other words, the pedestrian is present within the area A1 of the image (has the same orientation as the stopped vehicle 105). In addition, the intensity of the reflected waves from the pedestrian is weak. Thus, in FIG. 3, the pedestrian can be estimated to be present in the area 107 behind the stopped vehicle 105 from the perspective of the reference vehicle 103. Therefore, the target detecting device 1 estimates the position of the area 107 (in other words, the position of the pedestrian) from the position of the stopped vehicle 105 and the length of the side surface 105*b* of the stopped vehicle 105. The target detecting device 1 acquires the distance from the reference vehicle 103 to the area 107 as the distance from the reference vehicle 103 to the pedestrian.

At Step 60, the target detecting device 1 outputs, to the automatic braking device 101, the information on the target (such as the type of target, the orientation of the target from the perspective of the reference vehicle 103, and the distance from the reference vehicle 103) selected at above-described Step 56 or Step 62, described hereafter.

Here, when judged that the pedestrian has been detected in the area $A_1$ at Step 57 and the distance to the pedestrian has been acquired at Step 59 or Step 61, the target detecting device 1 outputs the value acquired at Step 59 or Step 61 as the distance to the pedestrian.

In addition, when judged NO at Step 51 or Step 52, the target detecting device 1 proceeds to Step 62. The target detecting device 1 performs target detection based on image recognition performed using the image sensor 5 and the ECU 7. Here, the number P of patterns of the upper body of a pedestrian used for image recognition is the normal value, 10. In addition, the value of N is also the normal value, 3. Furthermore, the distance to each of the detected targets is measured using the millimeter-wave sensor 3.

2. Effects Achieved by the Target Detecting Device 1 According to the Second Embodiment (1) The target detecting device 1 increases the number P of patterns of the upper body of a pedestrian used for image recognition in the area $A_1$. The area $A_1$ is an area in the image acquired by the image sensor 5 that overlaps with the stopped vehicle 105. The target detecting device 1 thereby preferentially detects the upper body of a pedestrian (in other words, the pedestrian).

Figure 4:
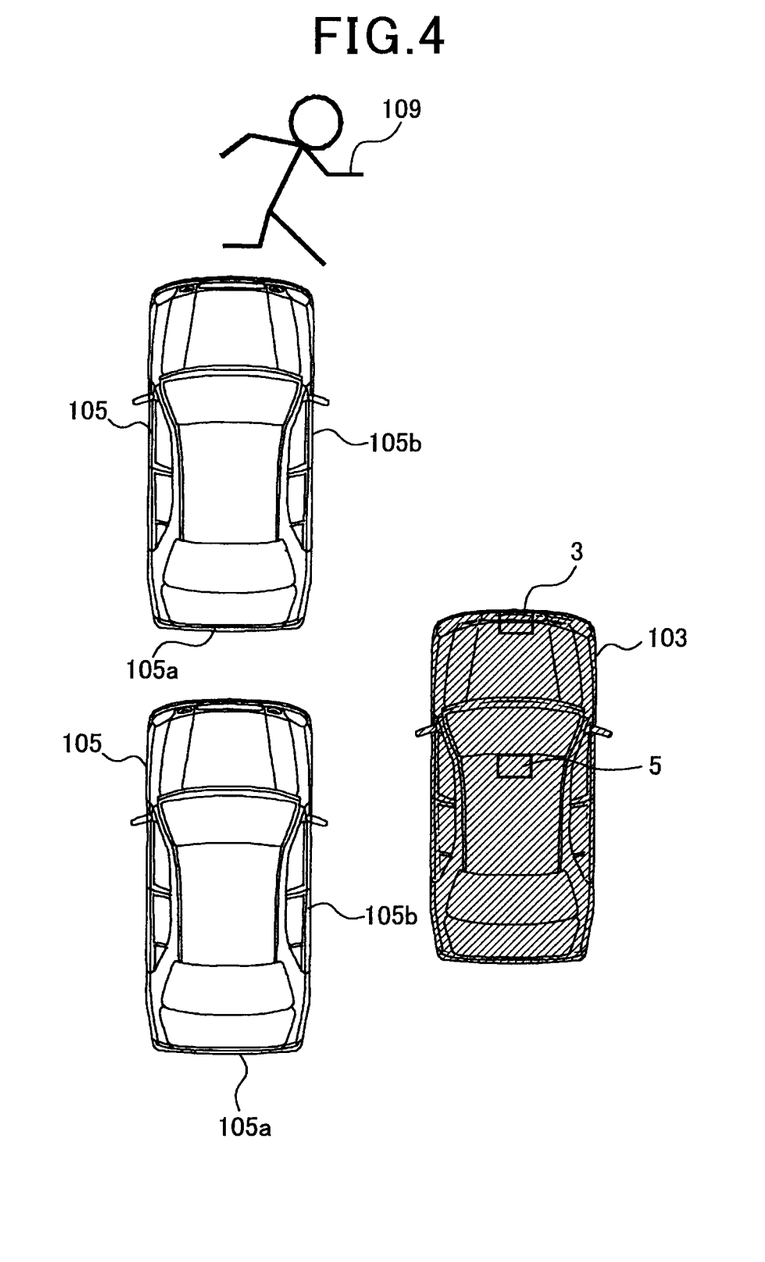
FIG. 4 shows an explanatory diagram of effects achieved by the target detecting device.
Figure 5:
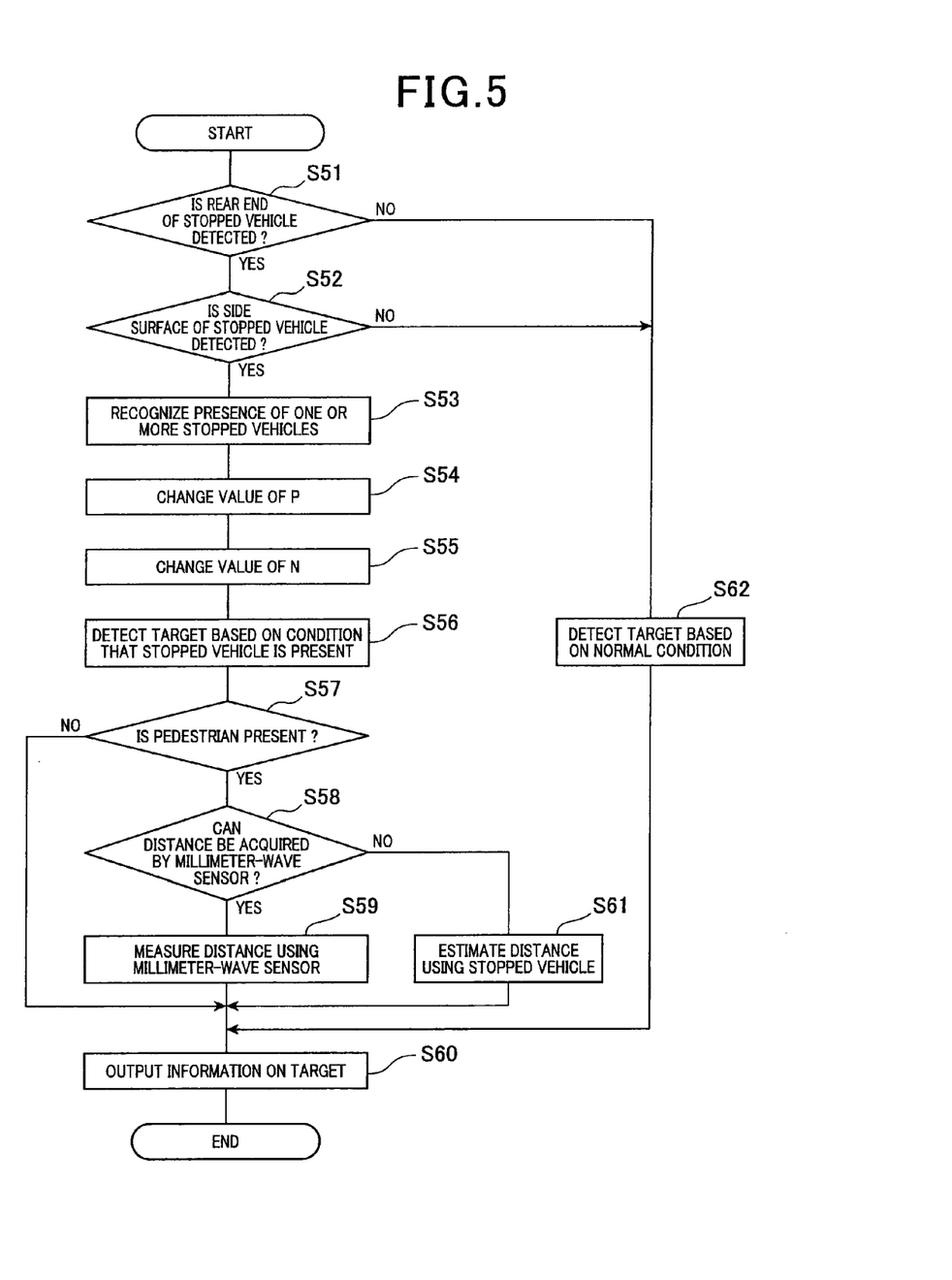
FIG. 5 shows a flowchart of a process performed by a target detecting device (second embodiment)

Therefore, as shown in FIG. 4, the target detecting device 1 can detect the pedestrian 109 even in an instance in which the pedestrian 109 is present behind the stopped vehicle 105 from the perspective of the reference vehicle 103 and only the upper body of the pedestrian 109 appears in the image acquired by the image sensor 5.

(2) The target detecting device 1 sets the value of N for image recognition in the area $A_1$ to a value that is smaller than normal. The area $A_1$ is an area in the image acquired by the image sensor 5 that overlaps with the stopped vehicle 105. The target detecting device 1 thereby relaxes the criteria for detecting a pedestrian.

Therefore, as shown in FIG. 4, the target detecting device 1 can detect the pedestrian 109 even in an instance in which the pedestrian 109 is present behind the stopped vehicle 105 from the perspective of the reference vehicle 103 and only the upper body of the pedestrian 109 appears in the image acquired by the image sensor 5.

(3) The pedestrian 109 may be present behind the stopped vehicle 105, from the perspective of the reference vehicle 103. The millimeter-wave sensor 3 may have difficulty measuring the distance to the pedestrian 109. However, even in such instances, the target detecting device 1 can estimate the position of the pedestrian 109 based on the position and length of the stopped vehicle 105.

(4) The target detecting device 1 detects the stopped vehicle 105 by detecting the rear end 105*a* and the side surface 105*b* of the stopped vehicle 105. Therefore, the target detecting device 1 can accurately detect the stopped vehicle 105.

4. Variation Examples of the Second Embodiment (1) At Step 54, the number P of patterns of the upper body of a pedestrian used for image recognition of the area $A_1$ is not limited to 30. The number P can be increased than the number at the normal conditions.

(2) At Step 55, the value N for image recognition of the area $A_1$ is not limited to 1. The value N can be decreased than the value at the normal conditions.

(3) At Step 51, the condition for judging that the rear end 105*a* can be detected may be either of "the rear end 105*a* of the stopped vehicle 105 is detected by image recognition performed using the image sensor 5 and the ECU 7" and "the millimeter-wave sensor 3 acquires reflected waves corresponding with the rear end 105*a* of the stopped vehicle 105."

(4) The area $A_1$ may include the area overlapping the stopped vehicle 105 and its surrounding area. In addition, the area $A_1$ may be overall image acquired by the image sensor 5.

<Third Embodiment>

The configuration of the target detecting device 1 and the process performed by the target detecting device 1 according to a third embodiment are basically similar to those according to the second embodiment. However, there are partial differences. The difference will mainly be described hereafter. The target detecting device 1 according to the third embodiment performs a process shown in the flowchart in FIG. 6. The process differs from that according to the second embodiment in that the above-described processing operation at Step 55 is not included. The processing operations at Step 101 to Step 111 correspond with Step 51 to Step 54 and Step 56 to Step 62 according to the second embodiment.

Figure 6:
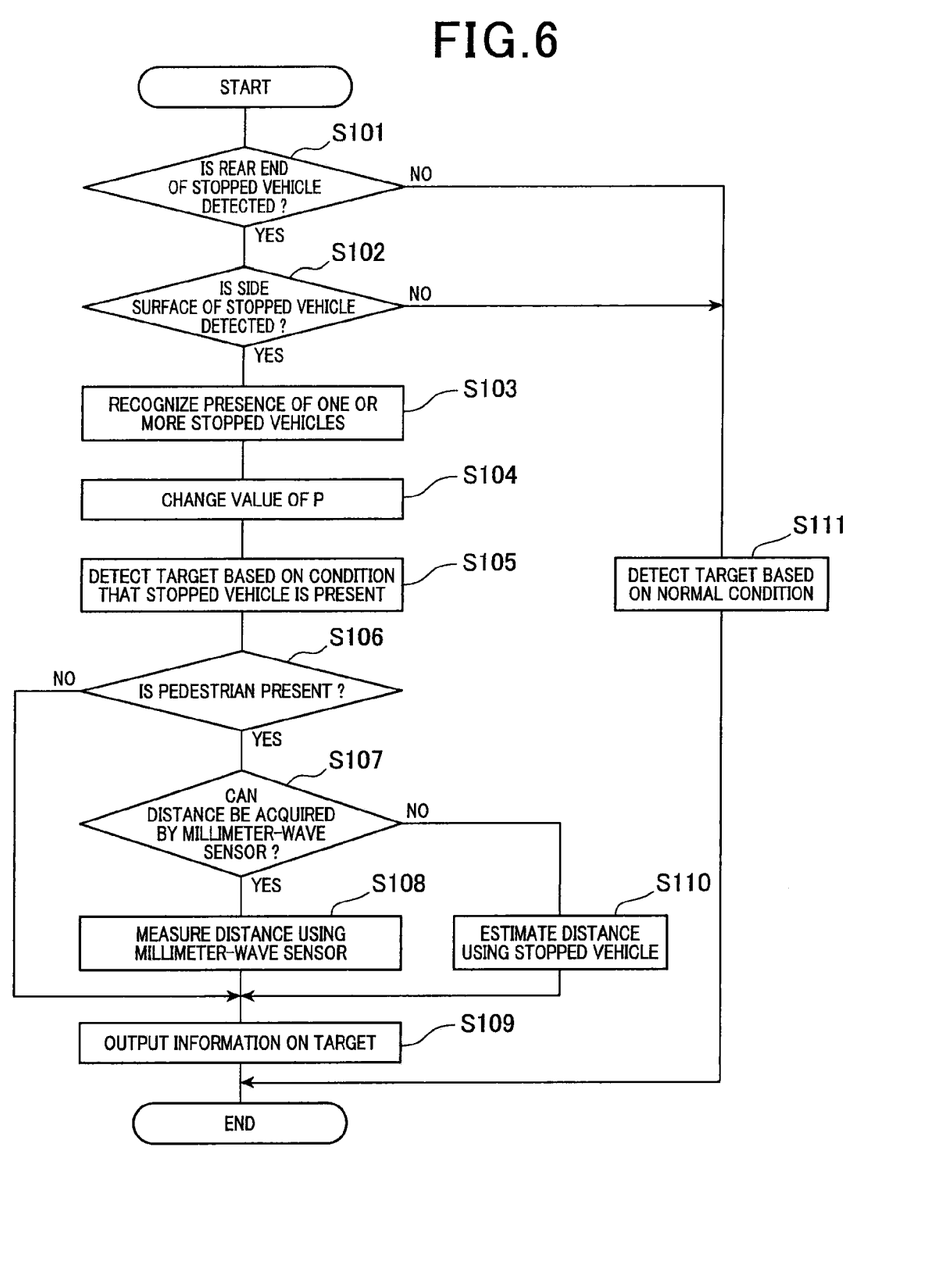
FIG. 6 shows a flowchart of a process performed by a target detecting device (third embodiment)

In other words, according to the third embodiment, the value of N remains set to the normal value (3) even for image recognition of the area $A_1$. The area $A_1$ is an area in the image acquired by the image sensor 5 that overlaps with the stopped vehicle 105. The target detecting device 1 according to the third embodiment achieves effects that are substantially similar to those according to the second embodiment, excluding effects attributed to the change in the value of N.

<Fourth Embodiment>

The configuration of the target detecting device 1 and the process performed by the target detecting device 1 according to a fourth embodiment are basically similar to those according to the second embodiment. However, there are partial differences. Hereafter the differences will mainly be described. The target detecting device 1 according to the fourth embodiment performs a process shown in the flowchart in FIG. 7. The process differs from that according to the second embodiment in that the above-described processing operation at Step 54 is not included. The processing operations at Step 201 to Step 211 correspond with Step 51 to Step 54 and Step 56 to Step 62 according to the second embodiment.

Figure 7:
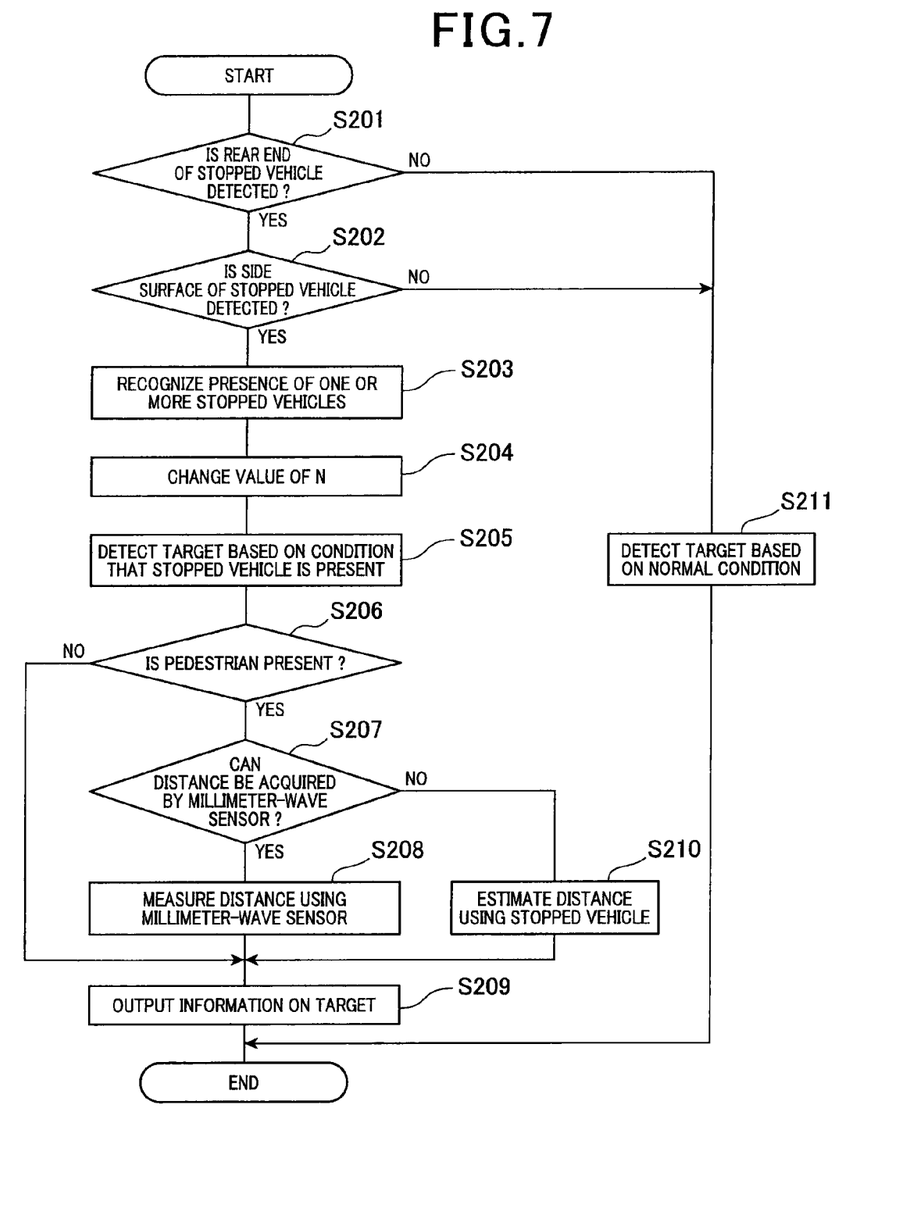
FIG. 7 shows a flowchart of a process performed by a target detecting device (fourth embodiment).

In other words, according to the fourth embodiment, the value of P remains set to the normal value (10) even for image recognition of the area $A_1$. The area $A_1$ is an area in the image acquired by the image sensor 5 that overlaps with the stopped vehicle 105. The target detecting device 1 according to the fourth embodiment achieves effects that are substantially similar to those according to the second embodiment, excluding effects attributed to the change in the value of P.

The present invention is not limited in any way by the above-described embodiments. For example, instead of the millimeter-wave sensor 3, a target detecting means for detecting a target by transmitting and receiving radar waves of other wavelengths can be used.

In addition, other methods, such as detecting a stopped vehicle using infrastructure information, may be used as the method for detecting the presence of a stopped vehicle.

What is claimed is:

1. A target detecting device mounted in a vehicle in order to avoid a collision between the vehicle and a target that is captured by a sensor mounted to the vehicle, the target detecting device comprising:

a radar sensor that transmits radar waves to a target present around a reference vehicle in which the target detecting device is mounted, and receives reflected waves from the target;

an imaging sensor that captures an image of an area around the reference vehicle; and an electronic control unit, the electronic control unit being configured to:

detect a target using information acquired by the radar sensor;

select a target that satisfies a predetermined condition, among targets detected by the radar sensor;

output information on a selected target;

detect a stopped vehicle present around the reference vehicle;

detect a target from the image acquired by the imaging sensor by performing image recognition using predetermined patterns of a target;

perform the image recognition more than once, and if an identical target is recognized more than a predetermined number of times, specify the recognized image as containing an object to be detected; and make, when the stopped vehicle is detected, criteria for detecting a pedestrian in at least an area of the image that overlaps the stopped vehicle from the perspective of the reference vehicle less restrictive, by reducing the predetermined number of times, compared to an instance in which a stopped vehicle is not detected.

2. The target detecting device according to claim 1, wherein the electronic control unit is further configured to detect a stopped vehicle by using at least one of: a target detected from information acquired by the radar sensor; and a target detect from the image acquired by the imaging sensor.

3. The target detecting device according to claim 1, wherein the electronic control unit is further configured to specify a stopped vehicle by detecting a rear end of a vehicle using at least either one of the imaging sensor or the radar sensor and thereafter detecting a side surface of the vehicle using the radar sensor.

4. The target detecting device according to claim 1, wherein the electronic control unit is further configured to estimate a position where a pedestrian may be present on a basis of both a position and a length of the stopped vehicle when a detected pedestrian is present in a same direction with a detected stopped vehicle from the perspective of the reference vehicle.

* * * * *